United States Patent

[11] 3,607,959

[72] Inventors John Estes
 Wappingers Falls;
 Robert M. Suggitt, Fishkill; Stanley
 Kravitz, Wiccopee, all of N.Y.
[21] Appl. No. 646,455
[22] Filed June 16, 1967
[45] Patented Sept. 21, 1971
[73] Assignee Texaco Inc.
 New York, N.Y.

[54] CATALYST FOR HYDROCARBON CONVERSION
 10 Claims, No Drawings
[52] U.S. Cl. ..................................................... 260/671,
  260/683.15, 252/441, 252/442
[51] Int. Cl. ........................................................ C07c 3/00,
  C07c 3/50
[50] Field of Search ............................................ 252/442;
  260/671, 658, 662, 683.15

[56] References Cited
 UNITED STATES PATENTS
3,268,618 8/1966 Fletcher ........................ 260/683.15

| 3,248,442 | 4/1966 | Goble | 260/471 |
| 2,584,103 | 2/1952 | Pines | 260/671 |
| 2,408,167 | 9/1946 | Hepp | 260/671 |
| 3,366,705 | 1/1968 | Gianetti | 260/683.68 |
| 2,642,384 | 6/1953 | Cox | 196/50 |
| 3,182,013 | 5/1965 | Myers | 208/112 |
| 3,235,617 | 2/1966 | Happel | 260/678 |

Primary Examiner—Patrick P. Garvin
Assistant Examiner—Philip M. Fernen
Attorneys—K. E. Kavanaugh, Thomas H. Whaley and H. L. Madinger ABSTRACT: This invention relates to a method of preparing a catalyst useful in hydrocarbon conversion such as alkylation and polymerization. More particularly, this invention relates to the polymerization of polymerizable hydrocarbons e.g. propylene and the alkylation of alkylatable hydrocarbons e.g. benzene in the presence of an alumina catalyst activated with an organic species having at least two carbon atoms per molecule, and chlorine or bromine in suitable proportions, or with a mixture of multicarbon activators and chlorine and bromine.

CATALYST FOR HYDROCARBON CONVERSION

BACKGROUND OF THE INVENTION

Highly active hydrocarbon conversion catalysts particularly useful for isomerization can be prepared by the method of copending application Ser. No. 600,021, now abandoned Dec. 8, 1966 entitled "Catalyst for Hydrocarbon Conversion" of John H. Estes, Robert M. Suggitt and Stanley Kravitz assigned to the assignee hereof. These catalysts are prepared by contacting a composite of alumina and platinum with an organic compound in the presence of chlorine or bromine at a temperature of about 200° to 800° F. A catalyst consisting essentially of about 0.01 to about 2.0 weight percent platinum and about 3.0 to about 15.0 weight percent chlorine is thus prepared. Catalysts useful in polymerization of polymerizable compounds especially lower olefins do not require the presence of platinum therein or other noble metals. This is also true for alkylation catalysts useful in alkylation of aromatic compounds e.g. benzene.

SUMMARY OF THE INVENTION

It is an object of this invention, therefore, to prepare such an alumina hydrocarbon conversion catalyst having catalytic activity.

It is an object of this invention, therefore, to prepare an alumina catalyst particularly useful in aromatic alkylation and as a polymerization catalyst particularly for lower molecular weight olefins.

It is another object of this invention to prepare such a catalyst using economic amounts of activator materials.

These and other objects of this invention will become apparent from the following more complete description of our invention and appended claims.

STATEMENT OF THE INVENTION

Broadly, this invention contemplates a method for preparing a catalyst consisting essentially of catalytically active alumina, and chlorine or bromine, which comprises contacting alumina with chlorine or bromine and an organic compound or a mixture of organic compounds having at least two carbon atoms each at temperatures of between 200° and 800° F., preferably between 450° F. and 650° F.

DESCRIPTION OF PREFERRED EMBODIMENTS

Since at temperatures above 700° F. there is a tendency for aluminum chloride formation, the flow rate of the gases through the alumina and the pressure on the system should be regulated when temperatures above 650° F. are employed. The process of our invention is most suitably performed at atmospheric pressure although subatmospheric and superatmospheric pressures can be employed. We prefer to use atmospheric or slight superatmospheric pressure because it minimizes cost attendant with the employment of pressures substantially below or above atmospheric pressure. We have found that using chlorine or bromine with an organic compound, or mixtures of organic compounds at temperatures between 450 and 650° F. and atmospheric pressure, there is provided a highly active catalyst useful in the alkylation of aromatics and polymerization of olefins. Olefins within the range of $C_2$-$C_4$ are polymerized in good yield using the alumina catalyst prepared by the process of this invention. The aforementioned specific polymerizable hydrocarbon, it should be understood, is merely exemplary of the polymerizable hydrocarbons which can be polymerized using the catalyst of this invention.

The catalyst prepared by our invention consists essentially of catalytically active alumina, and about 3.0 to about 15.0 percent by weight chlorine or bromine. It is prepared by using an organic compound, or mixture of organic compound as activating agents in conjunction with chlorine and/or bromine. The organic compound comprises at least two atoms of carbon, X atoms of hydrogen, Y atoms of chlorine and/or bromine and may or may not contain oxygen or sulfur. Either X or Y may be zero. The practical optimum mole ratio of molecular chlorine and/or bromine to the organic compound must be greater than $-Y/2$ if $X \geq Y$ (X is equal to or greater than Y) or greater than zero if $X<Y$ (X is less than Y). The amount of chlorine or bromine should be greater if the organic compound contains sulfur. Specifically, if there are Z atoms of sulfur in the organic compound the mole ratio of chlorine and/or bromine (Y) to organic compound should be greater than $X+2Z-Y/2$ if $X+2Z \geq Y$ or greater than zero if $X+2Z<Y$.

In particular, organic chloride activating agents which can be used in accordance with this invention include for example sym-tetrachloroethane, tetrachloroethylene, hexachloroethane, pentachloroethane, hexachloroacetone, hexachloro-1,3-butadiene, hexachloropropanone-2, hexachlorocyclopentadiene, hexachloropropylene, trichloroacryloylchloride, trichloroacetyl chloride and chloral. Of the aforementioned compounds we have found that tetrachloroethylene is a particularly useful organic chloride activating agent for activating the alumina composite according to the process of our invention. Further, organic compounds not containing halides can be used in conjunction with sufficient chlorine or bromine, for example, ethane and ethylene.

The exact mechanism by which the alumina composite is activated is not precisely understood especially since the process can be performed in the absence of oxygen or an oxygen containing atmosphere. This is particularly surprising since the process of a copending application Ser. No. 495,327 filed Oct. 12, 1965 entitled "Hydrocarbon Conversion Catalyst" of John H. Estes and Robert M. Suggitt necessitates use of an oxygen containing atmosphere in conjunction with multicarbon organic chloride activating agents employed in that process. It is also considered particularly useful that the process of this invention makes more economic use of the organic chloride activating agent than employed in the process of this copending application. If the chlorine or bromine organic chloride mole ratio is greater than that specified above no appreciable increase in catalytic activity is obtained. Since excess chlorine or bromine would be entailed in providing this higher mole ratio, from an economic standpoint it is generally not desirable to exceed this maximum.

With respect to temperature we have found that a temperature of at least about 450° F. is desirable for preparation of a highly active hydrocarbon conversion catalyst. Temperatures less than 450° F. are generally insufficient to provide a highly active catalyst needed for commercial size operations. On the other hand, temperature in excess of about 700° F. tends to promote the formation of aluminum chloride and other side products. Temperatures in excess of 800° F. should not be employed. We employ a temperature between 200° F. and 800° F., most preferably 450°–650° F.

The catalyst prepared by our invention can be produced in pellet, granular, bead, or pulverulent form to facilitate its use in fixed beds, moving beds, or fluidized solid beds as is well known in the art. The catalyst can be prepared in situ in a hydrocarbon conversion reactor by passing a stream of chlorine or bromine through a vessel containing the organic compound. Preferably, however, the halide and organic compound are added separately to the reaction zone since passing them together into the reaction zone can lead to side reactions producing compounds of substantially lower volatility and less reactivity in the system. In general, compounds suitable for chlorine or bromine promotion should have a reaction center, i.e.

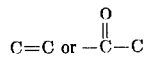

Completely halogenated compounds are less effective than those having a reaction center but may be used. The effluent is then charged into a hydrocarbon conversion reactor containing the alumina composite to be activated, maintained at a temperature between 200° F. and 800° F. The effluent from the hydrocarbon conversion reactor consists largely of hydrogen chloride and saturated chlorocarbons. Excess saturated chlorocarbons can be recycled.

For obvious economic reasons we prefer to employ chlorine together with the multicarbon organic chloride activators. However, in certain circumstances, one may prefer to utilize bromine as it is in liquid form at room temperature.

The catalyst prepared in accordance with this invention is highly active for alkylation at relatively low temperatures. Benzene is alkylated 250°–350° F and preferably within the range of 275° to 315° F. Isomerization can be effected in either the liquid or vapor phase. Pressures from atmospheric to the practical maximum as limited by materials of construction can be used. Pressures within the range of 300 to 750 p.s.i.g. have been found convenient. A liquid hourly space velocity (LHSV), that is the volume of liquid charged per hour per volume of catalyst, within the range of about 0.5 to 10.0 and preferably within the range of about 0.75 to 4.0 is suitable for this alkylation reaction using the catalyst prepared by our invention.

In order to more full illustrate the nature of our invention and manner of practicing the same, the following examples are presented. In these examples the best mode contemplated by us for carrying out our invention is set forth.

EXAMPLE I 166 grams of 1/16-inch alumina extrusions which had been dried at 1050° F. for 4 hours in an airstream were treated at 575° F. with a mixture of tetrachloroethylene and gaseous chlorine in a ratio of 1:1 which mixture was introduced to the $\eta$ alumina over a 24-hour period in an airstream passing through the alumina at a rate of 2 cubic centimeters per hour for the tetrachloroethylene, and 6.8 cubic centimeters per minute for the gaseous chlorine. The resultant catalyst contained 9.5 weight percent chlorine.

Alkylation of benzene with ethylene was performed by charging ethylene and benzene into a reactor in a mole ratio of about 1:4. The reactor contained 72 grams of the catalyst prepared by this example. The alkylation temperature was 300° F. and the reaction mixture was maintained under a pressure of about 700 p.s.i.g. at a nominal charge ration of 72 grams per hour (1.0 liquid hourly space velocity). Four 4-hour periods of this alkylation reaction were run. Yield data on the product obtained is shown below.

| Period | Benzene | Ethylbenzene | $C_{10}$ aromatics | Higher aromatics | Other hydrocarbons |
|---|---|---|---|---|---|
| A | 81.2 | 16.2 | 0.8 | 0.7 | 1.0 |
| B | 79.7 | 17.7 | 0.8 | 0.8 | 0.9 |
| C | 81.9 | 16.7 | 0.6 | 0.6 | 0.2 |
| D | 79.9 | 17.9 | 1.0 | 0.9 | 0.3 |

Propylene was charged to 20 grams of the above catalyst maintained at ice temperatures at a rate of 0.04 moles per minute using 500 milliliters of normal heptane as a solvent. After 3 hours, the polymerization reaction was stopped and the solvent stripped. The product was weighed. A yield of 7.6 grams of polymer having a molecular weight of 659 was realized, the yield being about 50 percent conversion. The polymer was polypropylene.

From the foregoing it is seen that we have provided a significantly useful process for the preparation of a catalyst useful in alkylation of e.g. benzene with ethylene and polymerization of lower molecular weight olefins e.g. propylene. Our alumina catalyst is also useful in the isomerization of olefin hydrocarbon. It is seen that our process can be performed in situ i.e. within the hydrocarbon conversion reactor itself and does not require activation of the catalyst outside the reactor with the attendant problems of protecting from water vapor when transferring it to the hydrocarbon conversion reactor. It should be further noted that our process can be performed to regenerate spent alumina catalyst by first heating the spent catalyst to decarbonize the catalyst and then treating in the manner of our invention. Our process can be performed without use of expensive chemicals, high pressures or temperatures and is thus suited for commercial operation.

The terms and expressions which have been employed herein as terms of description and not of limitation, as there is no intention, in the use of such terms and expressions, of excluding any equivalents of the features shown and described or portions thereof, as it is recognized that various modifications are possible within the scope of the invention claimed. For instance, the process of our invention can be performed on an alumina catalyst containing silica. In such a case, a highly active catalyst is prepared.

What is claimed is:

1. A method for preparing a catalyst consisting essentially of alumina and about 3.0 to about 15.0 percent by weight chlorine or bromine which comprises contacting alumina at temperatures between 200° and 800° F. with (1) molecular chlorine or bromine and (2) an organic compound selected from the group consisting of sym-tetrachloroethane, tetrachloroethylene, hexachloroethane, pentachloroethane, hexachloroacetone, hexachloro-1,3-butadiene, hexachloropropanone-2, hexachlorocyclopentadiene, hexachloropropylene, trichloroacryloyl chloride, trichloroacetyl chloride, chloral, ethane and ethylene, wherein the mole ratio of said molecular chlorine or bromine to said organic compound is greater than $-Y/2$ if X is equal to or greater than Y or greater than 0 if X is less than Y, where X corresponds to the number of hydrogen atoms in said organic compound and Y corresponds to the number of chlorine atoms in said organic compound.

2. A process according to claim 1 wherein said composite is contacted at a temperature within the range of 450°–650° F.

3. A process according to claim 1 wherein said composite is contacted with chlorine.

4. A process according to claim 1 wherein said composite is contacted with bromine.

5. A process according to claim 1 wherein said organic compound is chloral.

6. A process according to claim 1 wherein said organic compound is tetrachloroethylene.

7. In a process for olefin conversion selected from the group consisting of aromatic alkylation and polymerization the improvement which comprises contacting the reactants with a catalyst consisting essentially of alumina and about 3.0 to about 15.0 percent by weight chloride or bromine, said catalyst prepared by contacting alumina at temperatures between 200° and 800° F. with (1) molecular chlorine or bromine, and (2) an organic compound selected from the group consisting of sym-tetrachloroethane, tetrachloroethylene, pentachloroethane, hexachloroacetone, hexachloro-1,3-butadiene, hexachloropropane-2, hexachlorocyclopentadiene, hexachloropropylene, trichloroacryloyl chloride, chloral, ethane and ethylene; wherein the mole ratio of said molecular chlorine or bromine to said organic compound is greater than $X-Y/2$ if X is equal to or greater than Y or greater than 0 if X is less than Y, where X corresponds to the number of hydrogen atoms in said organic compound and Y corresponds to the number of chlorine atoms in said organic compound.

8. A process according to claim 7 wherein said olefin conversion process is aromatic alkylation and where benzene is alkylated with ethylene.

9. A process according to claim 7 wherein said olefin conversion process is polymerization and where said olefin is propylene.

10. A catalyst consisting essentially of alumina and about 3.0 to about 15.0 percent by weight chlorine or bromine, said catalyst prepared by contacting alumina at temperatures between 200° and 800° F. with (1) molecular chlorine or bromine, and (2) an organic compound selected from the group consisting of sym-tetrachloroethane, tetrachloroethylene, pentachloroethane, hexachloroacetone, hexachloro-1,3-butadiene, hexachloropropane-2, hexachlorocyclopentadiene, hexachloropropylene, trichloroacryloyl chloride, chloral, ethane and ethylene, wherein the mole ratio of said molecular chlorine or bromine to said organic compound is greater than X−Y/2 if X is equal to or greater than Y or greater than 0 if X is less than Y, where X corresponds to the number of hydrogen atoms in said organic compound and Y corresponds to the number of chlorine atoms in said organic compound.

PO-1050
(5/69)

UNITED STATES PATENT OFFICE
CERTIFICATE OF CORRECTION

Patent No. 3,607,959          Dated September 21, 1971

Inventor(s) JOHN H. ESTES, ROBERT M. SUGGITT, STANLEY KRAVITZ

It is certified that error appears in the above-identified patent and that said Letters Patent are hereby corrected as shown below:

Column 2, line 4, "-Y/2 " should read --X-Y/2--

Column 4, line 29, "-Y/2" should read --X-Y/2--

Signed and sealed this 19th day of September 1972.

(SEAL)
Attest:

EDWARD M. FLETCHER, JR.          ROBERT GOTTSCHALK
Attesting Officer          Commissioner of Patents